United States Patent [19]
Wallace

[11] Patent Number: 6,073,906
[45] Date of Patent: Jun. 13, 2000

[54] WATER WELL RECHARGE THROTTLE VALVE

[75] Inventor: Glenn E. Wallace, Anaheim, Calif.

[73] Assignee: VoV Enterprises, Inc., Anaheim, Calif.

[21] Appl. No.: 09/377,685

[22] Filed: Aug. 20, 1999

Related U.S. Application Data

[63] Continuation-in-part of application No. PCT/US98/11797, Jun. 9, 1998, application No. 08/871,652, Jun. 9, 1997, Pat. No. 5,871,200.

[51] Int. Cl.[7] .......................... F16K 31/122; F16K 47/00
[52] U.S. Cl. ............................ 251/63; 92/111; 92/117 A; 166/320; 251/205; 251/324; 405/52; 405/80
[58] Field of Search .......................... 92/110, 111, 117 R, 92/117 A; 166/320; 251/62, 63, 205, 324, 325; 405/36, 52, 80

[56] References Cited

U.S. PATENT DOCUMENTS

| | | | |
|---|---|---|---|
| 353,548 | 11/1886 | Franklin | 251/205 |
| 922,060 | 5/1909 | Stockdon | 251/205 |
| 966,911 | 8/1910 | Hardsocg | 92/111 |
| 1,799,373 | 4/1931 | Humason | 166/205 |
| 1,909,179 | 5/1933 | Huffman | 92/111 |
| 1,919,955 | 7/1933 | Leech et al. | 251/205 |
| 2,654,395 | 10/1953 | Kaye | 251/122 |
| 2,664,859 | 1/1954 | Green | 92/111 |
| 3,120,267 | 2/1964 | Bayless | 166/332 X |
| 3,220,693 | 11/1965 | Dickson | 251/122 |
| 3,379,405 | 4/1968 | Natho | 251/327 |
| 3,497,004 | 2/1970 | Page, Jr. | 251/63 |
| 3,679,169 | 7/1972 | Bedo et al. | 251/122 |
| 3,761,053 | 9/1973 | Bedo et al. | 251/122 |
| 3,908,536 | 9/1975 | Bajcar | 251/325 |
| 3,937,247 | 2/1976 | Van Der Wal | 251/325 |
| 4,047,695 | 9/1977 | Cleveland et al. | 138/46 |

(List continued on next page.)

FOREIGN PATENT DOCUMENTS

282823  3/1952  Switzerland .............................. 251/63

*Primary Examiner*—George L. Walton
*Attorney, Agent, or Firm*—Millen, White, Zelano & Branigan

[57] ABSTRACT

A water well recharge throttle valve is configured as a hydraulically actuated flow control device that permits calibrated throttling of water used in Artificial Storage and Recovery (ASR), Salt Water Barrier, Dedicated Recharge and Injection Wells to prevent the free cascading of water and thereby eliminate the entrainment of air which may cause air fouling, bio-fouling, and calcite formation with a resultant reduction in permeability of the aquifer. The valve includes a fixed tubular member which is selectively mounted in one of three ways: (1) to the lower end of the pump column, below the pump with a check valve/strainer mounted below the unit and including a co-generation/recharge feature; (2) to the lower end of the pump column, and above the check valve and submersible pump; and (3) to the lower end of a drop pipe, with a blind flange connected to the bottom end of the valve, a dedicated recharge well application. In each arrangement, the inner member contains fixed flow control openings in which an outer, upwardly based flow regulating tubular member is axially moved by a double acting hydraulic actuator to adjust flow through the flow control openings. The inner member has a wall with two passages therein for directing hydraulic fluid to opposite sides of a flow barrier thereon which separates a main chamber in the double acting hydraulic actuator into two sub-chambers. The double-acting actuator is axially shifted by filling one chamber or the other. The axial position of the valve is controlled by a double acting hydraulic actuator built into the unit and connected with small stainless steel tubes to a hydraulic flow control valve and a hydraulic pump. The hydraulic actuator is controlled by a speed control valve and a solenoid actuated, modular locking pilot operates a hydraulic flow control valve through tubes connected to the valve. The flow is monitored by using a flow meter and pressure gauge in the hydraulic circuit. The desired flow is set by adjusting the valve hydraulically while monitoring the flow. The operator may adjust the flow of water to any increment within the range of the valve.

7 Claims, 6 Drawing Sheets

U.S. PATENT DOCUMENTS

| | | | |
|---|---|---|---|
| 4,114,851 | 9/1978 | Shivak et al. | 251/122 |
| 4,134,454 | 1/1979 | Taylor | 166/320 |
| 4,149,698 | 4/1979 | Deaton | 251/63.6 |
| 4,280,569 | 7/1981 | Mount, II | 251/63 |
| 4,285,495 | 8/1981 | King | 251/63.5 |
| 4,330,012 | 5/1982 | Chadwick | 251/63 |
| 4,377,177 | 3/1983 | Claycomb | 251/122 |
| 5,090,450 | 2/1992 | Pelech | 251/325 |
| 5,618,022 | 4/1997 | Wallace | 251/62 |

WATER WELL RECHARGE THROTTLE VALVE

RELATED PATENT APPLICATIONS

This application is a continuation-in-part of PCT/US98/11797 filed Jun. 9, 1998 having priority based on U.S. patent application Ser. No. 08/871,652 filed Jun. 9, 1997 now U.S. Pat. No. 5,871,200.

BACKGROUND OF THE INVENTION

1. Field of the Invention

This invention is generally directed to flow control devices for use in water wells and in particularly to a downhole flow controller for use in recharge, injection and aquifer storage recovery wells wherein the VoSmart (a Variable Orifice Selective Monitored Artificial Recharge Throttle) valve continuously regulates the flow of water during periods of recharging. During recharging the water in the column or drop pipe is controlled to prevent air from being entrained or trapped in the fluid flow and carried into the aquifer. Entrained air can adversely affect the recharge efforts, through air-fouling, bio-fouling and calcite formation, by blocking the flow of water into the aquifer.

2. History of the Invention

Many water districts and communities have realized the need and value of maintaining the water level and storage capacity of the aquifers that provide their drinking water. Further due to the high demand and to the variability of supply and demand, it is logical that an adequate reserve capacity of the water storage facilities be maintained to provide for extended peak demands, droughts and explosive growths in new customers. Reserve storage capacity to provide for these events in capital facilities is prohibitively expensive to construct and more difficult to justify, therefore capital facilities typically lag behind demand.

In an effort to reduce these capital facility costs, water resource engineers have become interested in the concept of replacing or storing large volumes (banking) of treated water in aquifers during periods of the year when both water and facility capacity are available to supply water required to recharge aquifers. The concept replacing the water pumped from the aquifer or seasonal storage is called Aquifer Storage Recovery or ASR. This scenario is an alternative to conventional expansion of water supply, treatment, distribution and storage capital facilities is quite cost effective in areas where it is technically feasible. In general, a well based system or one that is partially well based is a system that the wells can be used for both recharge and recovery. In recovery, the water may require only disinfection. Recharge wells may be through existing wells or through dedicated recharge wells.

In addition to reduction in facilities expansion costs, other advantages favor recharge technology. In coastal areas reduced levels in aquifer water may permit the intrusion of salt water which can result in the destruction of the fresh water supply. In these areas, a mound of recharged fresh water is placed, through balanced flow control, in the aquifer forming a uniform curtain or barrier between the salt water and the fresh water, effectively preventing salt water intrusion. At times, this volume of water can be used to meet seasonal peak demands.

Such storage and water resource techniques have proven extremely advantageous and cost effective in areas where declining ground water levels have reduced or left wells nearly non-productive.

Another application of this type of device is the use in ground water remediation. In areas where existing ground water supplies are threatened or have been contaminated flow control devices are effective in managing an effective program. Once the water is extracted and treated, this type of flow control device is able to balance the flow in a series of recharge wells to provide a uniform curtain of water, placing the water in the aquifer evenly and uniformly.

Well recharging is also effective where substantial reserves are necessary to improve system reliability in the event of a catastrophic loss of a primary water supply or in communities where strategically located reserves are required to ensure an adequate balance in system flows during peak demand.

Although there are obvious benefits to be obtained from recharging existing production water wells or in constructing new water storage recovery wells, in many applications problems have been encountered with air entrapment in the recharge water causing air binding of the aquifer. Air binding effectively decreases the permeability of the aquifer, thereby decreasing the effectiveness of the recharging operations. Such air entrapment is most frequently encountered in areas or localities where one or more of three conditions exist. These conditions may be encountered when: (1) the recharge water must drop a considerable distance from the well head to the static water level; (2) when the recharge flow is relatively low; and (3) where the specific capacity of the well is relatively high. The foregoing conditions have resulted in the cascading of water in the column or drop pipe, thereby entrapping large quantities of air which is carried into the well and outwardly into the aquifer. The entrapped air can effectively plug or seal the aquifer, a condition known as air fouling, resulting in substantially lower permeability and storage capacity. The answer to mitigating this problem is to pump the well, thereby restoring a portion of the lost capacity.

There have been flow control devices developed by the oil and gas industry, such controllers are not suitable for use in controlling cascading in recharge, injection or aquifer storage recovery wells. One alternative used to mitigate the air entrainment involves the use of multiple small injection tubes to place the water in the aquifer. Such alternative is possible in wells using large diameter well casing and well screens. This system is costly and generally not suitable for retrofitting existing wells.

SUMMARY OF THE INVENTION

The invention is directed to a downhole flow control device for continuously regulating the flow of water during recharge, injection or aquifer storage recovery. During recharge, the flow is controlled to prevent cascading water which would otherwise lead to air-fouling or aquifer plugging through air entrapment. The embodiment includes two concentric cylinders or tubular members, one of which has flow control ports, the other is connected to and selectively moved by the hydraulic actuator section, thereby setting the flow through the ports by varying their size.

The inner tubular member with the control ports is stationary and the outer tubular member is moved vertically by hydraulic pressure in the double acting hydraulic actuator section. The hydraulic actuator is controlled through two capillary tubes from the well head by a solenoid or manually operated three-position, four-way control valve in series with a flow control valve. The hydraulic pressure is supplied by an electrically driven pump. Speed of operation is set by adjusting the hydraulic fluid flow control valve manually or automatically. The solenoid valve may be controlled locally or by a Supervisory Control and Data Acquisition (SCADA) system from a remote location.

The device is connected in one of three ways: first, by being installed below a vertical turbine pump and above a foot valve, a configuration that is set up for co-generation during recharge; second, being installed above a submersible pump and check valve; and third, being connected to the bottom end of the injection pipe with the device closed at its lower end.

In dual purpose wells used for both water production and recharge (also known as aquifer storage and recovery, or ASR, wells), the device is installed at the base of the pump column, just below the pump bowls and above the foot valve/strainer. This application is best suited for co-generation during recharge, the pump is rotated during recharge and the motor becomes a generator producing electricity. A second application is with the device installed above a submersible pump and check valve. During recharge the pump and motor are stationary. In single purpose recharge or injection wells, the device with a closed lower end, is connected to the bottom of the drop pipe and set near the top of the well screen.

The primary objective of the device is to produce downhole flow control for use with recharge, injection and aquifer storage recovery (ASR) wells wherein the flow of the recharge water is facilitated and controlled in order to eliminate a significant amount of air-fouling or well plugging through air binding form air entrapment.

Another objective of the invention is to provide downhole flow control for recharge, injection and ASR wells which are designed to be incorporated within existing or new wells in order to reduce air entrainment which is normally associated with recharge operations.

It is also an objective of this invention to provide a simple, durable and cost effective flow control for regulating the flow hydraulically, while monitoring a flow measuring device (meter) which assures a desired well flow that can be adjusted to meet the specific static and operational pressures that are encountered or anticipated in a variety of environments.

It is a further objective of this invention to provide downhole flow control for preventing air binding in recharge, injection and ASR wells wherein minor adjustments to flow may be selectively regulated from the well head.

The term "entrained air" is a technical term describing the action taking place in a waterfall. In this case, the waterfall is inside the drop pipe of an artificial storage and recovery (ASR) or recharge well. This can have detrimental effects and can nearly stop the flow of recharge water. It is therefore another object of this invention to prevent entrained air from interfering with the flow of recharge water.

Supervisory Control and Data Acquisition (SCADA) control of the device may take many forms, depending on the degree of complexity desired. A minimum system may consist of a pressure sensor at the well head as a control device to maintain a minimum pressure and a flow meter. The pressure sensor is used to maintain a positive water pressure at the well head of 5–10 PSI minimum. The water meter is for monitoring and controlling water flow rate through the system and is controlled by a valve. The pressure sensor is monitored by the SCADA system with appropriate electronic signals sent to the power unit for incremental adjustments to the power unit. The power unit controls the hydraulic solenoid and then to the valve by using hydraulics and connecting fluid and hoses. A unique feature of the hydraulic power unit is a pilot operated check valve configured according to the invention. This feature hydraulically locks hydraulic fluid used to control the check valve in position when the solenoid valve is in the center position or when the power unit is shut off.

According to another aspect of the invention, the sequence of starting up the system is to start with the valve in the closed position, then fill the drop pipe with water, and then pressurize connecting piping. This allows the air inside the drop pipe to escape through an air vacuum valve at the well head. The valve may now be positioned manually or by SCADA control to reach and maintain a desired flow rate.

During times when the valve is not being adjusted, the power unit is normally powered down or placed in a stand-by mode by the SCADA system. When the valve needs to be adjusted, the power unit is turned on, adjustments made to set or reset the water flow by monitoring the flow meter with the SCADA system.

DETAILED DESCRIPTION OF THE PREFERRED EMBODIMENT

Figure 1A:
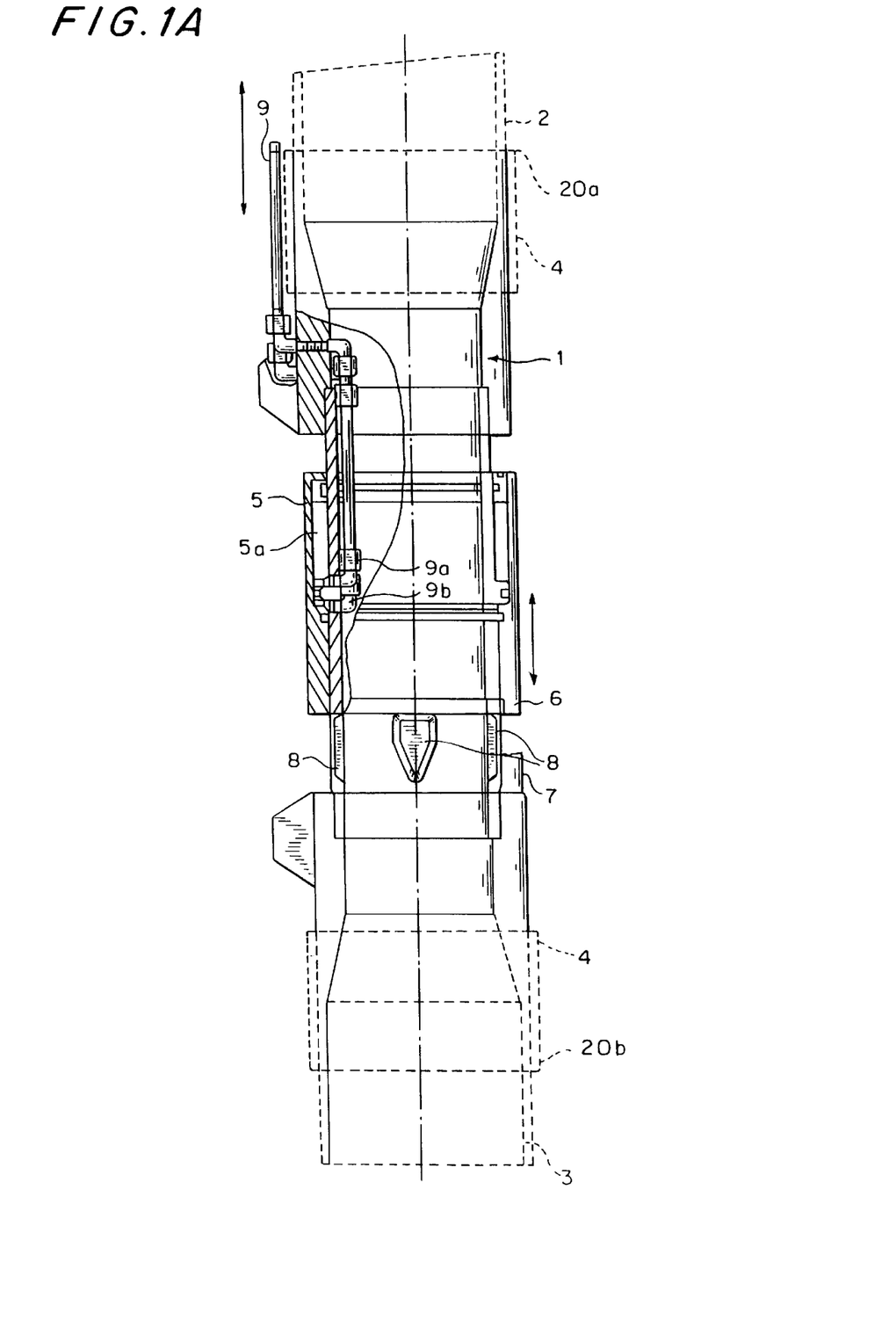
FIG. 1A is a sectional view of a first embodiment of well recharge throttle valve according to the invention in an open position.
Figure 1B:
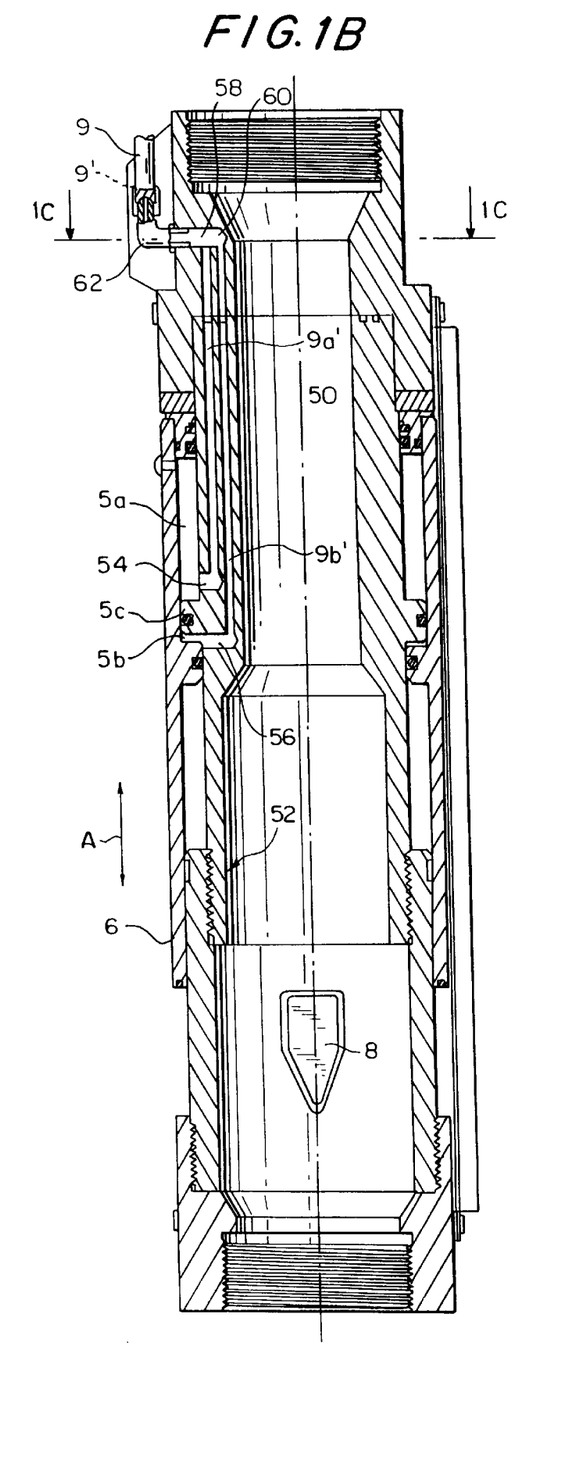
FIG. 1B is a side elevational view of a second embodiment of a well recharge throttle valve according to the invention in an open position.
Figure 1C:
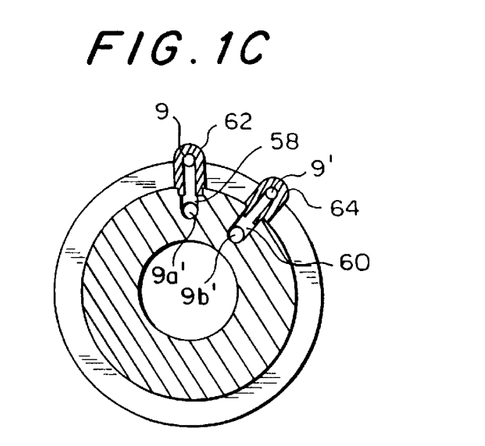
FIG. 1C is an elevation taken along lines 1C—1C of FIG. 1B.
Figure 2:
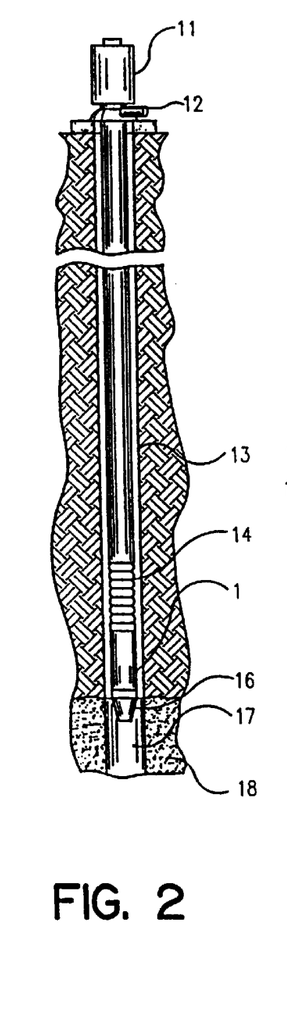
FIG. 2 is a sectional view through an ASR well illustrating the location of the well recharge throttle valve mounted below a vertical turbine pump column and above a foot valve in an installation used for co-generation with a vertical turbine pump.
Figure 3:
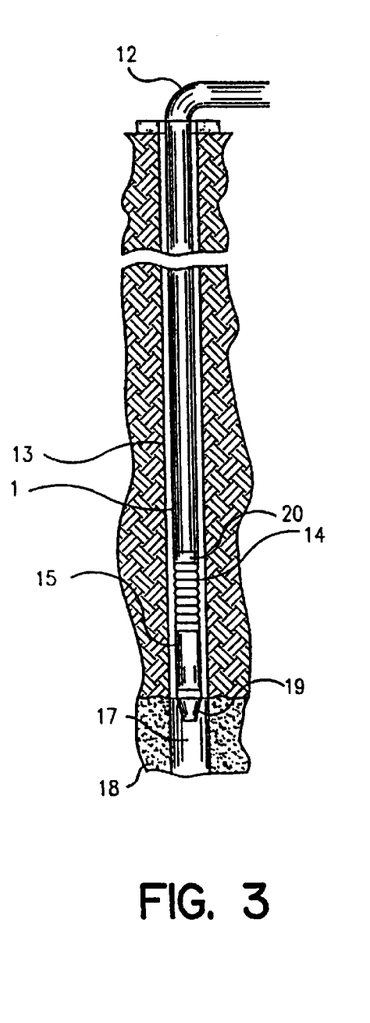
FIG. 3 is a sectional view through an ASR well illustrating the location of the well recharge throttle valve above a submersible pump and check valve.
Figure 4:
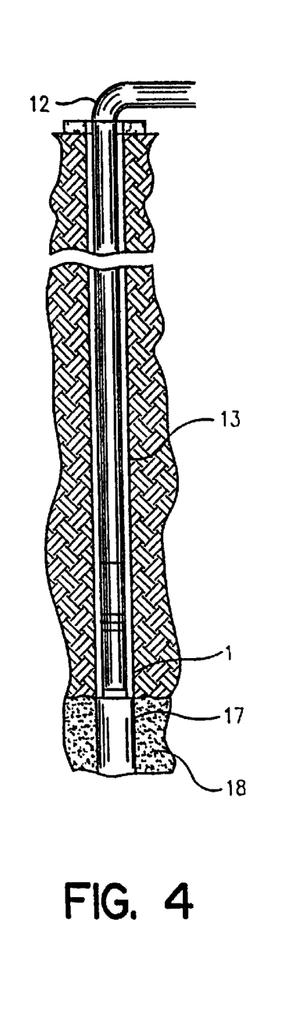
FIG. 4 is a sectional view through all injection well illustrating an installation well recharge throttle valve at the bottom of a drop pipe and near the top of a well screen.
Figure 5:
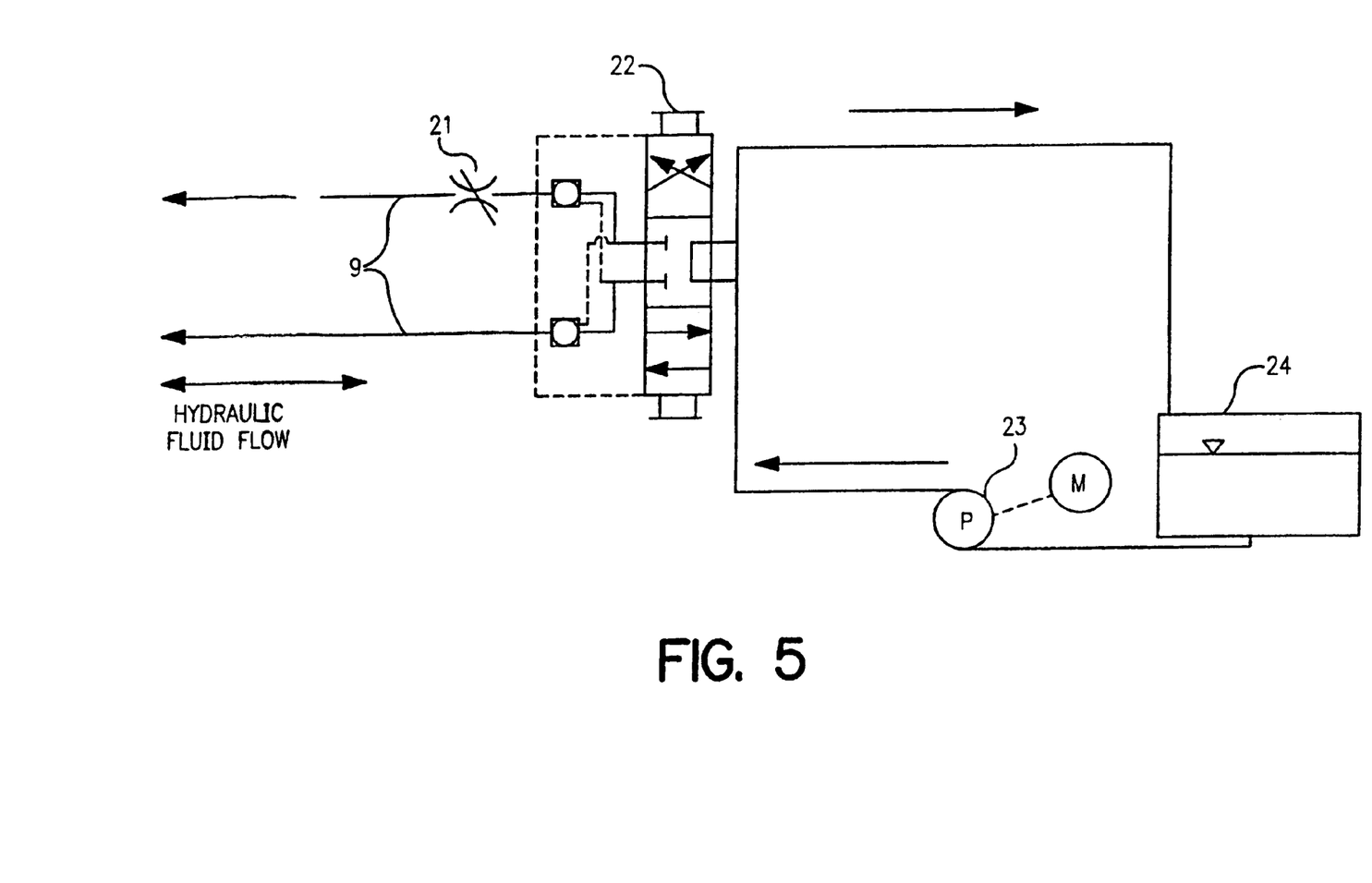
FIG. 5 is a schematic drawing of a hydraulic control circuit used with the present invention.

FIG. 1A illustrates a first embodiment of the invention, A Variable Orifice Selective Monitored Artificial Recharge Throttle (VoSmart) valve, while FIGS. 1B and 1C illustrate a second embodiment of the invention. FIGS. 2, 3 and 4 illustrate the various combinations of application for this embodiment. FIG. 5 schematically illustrates the hydraulic system used as a control apparatus and for hydraulic fluid power. The VoSmart valve is operated under positive hydraulic pressure and is hydraulically locked when not being operated. In the event of loss of hydraulic fluid in one of the hydraulic lines, the valve will remain locked in the last set position or fail safe position, in the event of loss of hydraulic fluid in both lines the valve will slowly close. The hydraulic fluid is propylene glycol or other fluid that is not an environmental hazard, in the event of loss of hydraulic fluid.

In FIG. 1A, the VoSmart valve is generally identified by the number 1 and is configured as a pipe section having an upper end 20a and a lower end 20b. The valve 1 incorporates fluid lines 9a and 9b which deliver hydraulic fluid under pressure to the double acting hydraulic actuator portion 5 of the valve which moves the throttling portion 6, which is configured as a sleeve over the "D" orifices 8 to control water flow through the orifices during the recharge operation. The line 9a is connected to chamber 5a to the left of the throttling portion 6 up while the line 9b is connected to the chamber 5b to push the throttling portion 6 down. When the pump is operating, the valve 1 is in the closed position 7. When used in conjunction with a pump, the VoSmart valve will have a flow inhibitor in the form of a check valve at the location 3 indicated in FIG. 1. In the dedicated recharge application of FIG. 4, the flow inhibitor is a blind flange installed at location 3.

As is seen in FIGS. 2–4, the recharge pipe 12 is connected to a source of pressurized water (connecting pipe 35 of FIG. 5). As has been set forth in the "Background of the Invention," it is necessary to avoid cascading if one is to keep the recharge pipe full which is accomplished by adjusting the throttle portion 6 of the valve.

Figure 6:
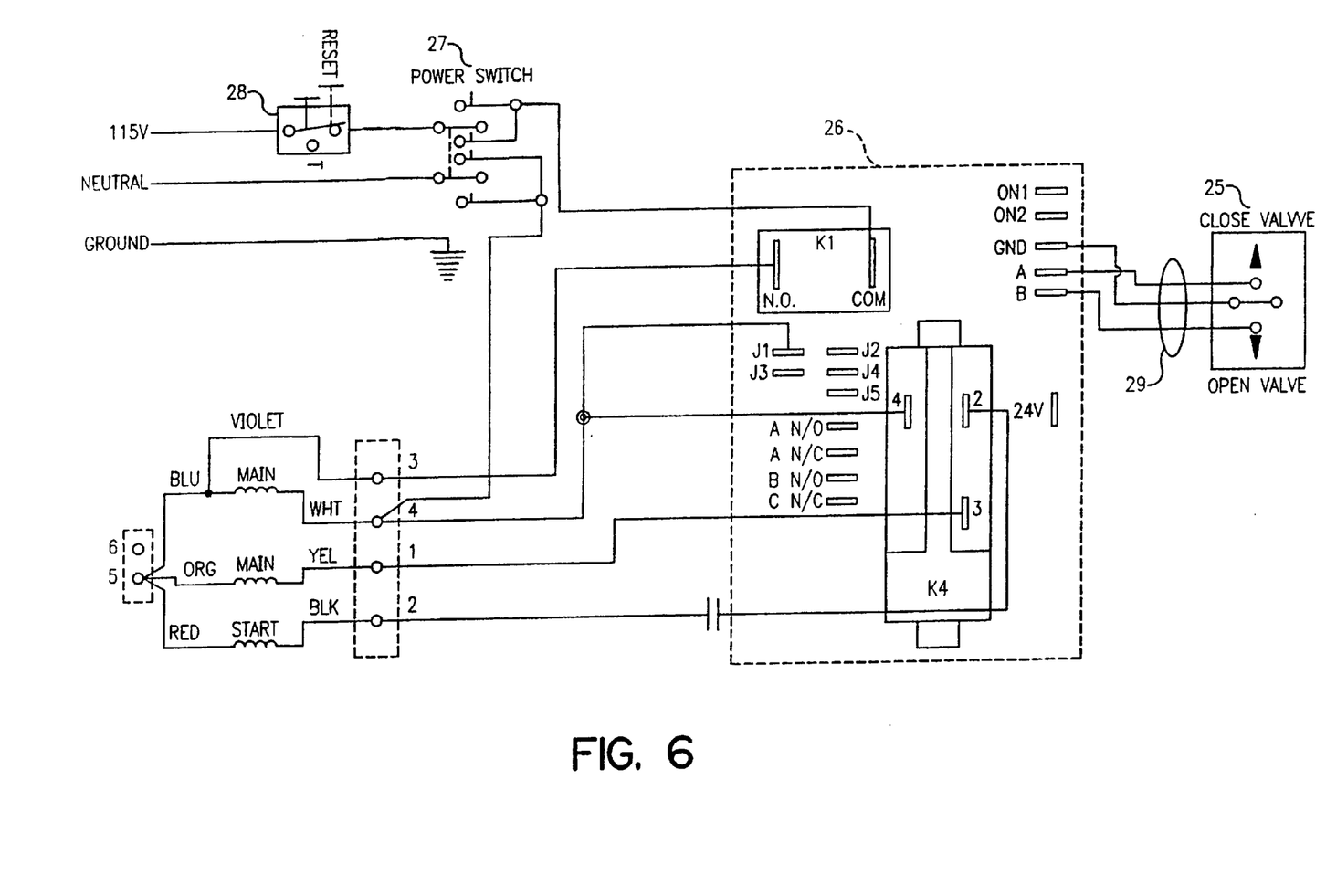
FIG. 6 is a schematic drawing of a power unit and solenoid control valve used with the present invention.

The valve may be adjusted within the design range by observing a flow monitoring means or flow meter which is a part of the normal piping at the well head. The meter is also used to total and record the flow of water during pumping or recharge. The initial pumping rate and recharge rate is determined by a geologist at the time of drilling from pump tests and aquifer test data. To operate the VoSmart valve, the hydraulic power unit 27 (FIG. 6) is turned on and the switch operating the solenoid control valve 25 depressed in the close or open position, the hydraulic directional control valve 22 is shifted from the locked position by an electrical control 26 and hydraulic fluid is forced through the capillary lines 9, FIG. 5, 1, by the pump 23, FIG. 5, taking fluid from the reservoir 24 to one of the capillary tubes 9, FIG. 5, 1, with hydraulic fluid returning in the other capillary tube 9 to the hydraulic storage tank 24, FIG. 5, operate the valve 1 moving the throttling portion 6 to increase or decrease the size of the "D" ports 8. The speed of operation is set by adjusting the speed control valve 21, FIG. 5.

FIGS. 1B and 1C illustrate a second embodiment 1' of the valve 1 wherein the lines 9a and 9b are replaced by lines 9a' and 9b'. The lines 9a' and 9b' are axial passageways formed in the wall 50 of the actuator 52 around which the double acting actuator portion 5 with the throttling portion 6 is positioned. The axial passageways 9a' and 9b' have lateral bores 54 and 56 which communicate with the sub-chambers 5a and 5b, respectively. As with the first embodiment, the sub-chambers 5a and 5b are separated by a flow barrier (5c) projecting from the wall 50 of the actuator 52. As is seen in FIG. 1C, radial bores 58 and 60 at the other ends of passageways 9a' and 9b' receive elbows 62 and 64, respectively, which are circumferentially off-set from one another. The elbows 62 and 64 are connected to lines 9 and 9', respectively, which when selectively pressurized with fluid move the double acting actuator portion 5 in the direction of arrow A. The second embodiment 1' of the valve functions in the same manner as the first embodiment of FIG. 1A.

Due to the wet environment in which the valves 1 and 1' operate, the component parts of the valves are fabricated from highly corrosive resistant steel. The column pipe 2 and the check valve or blind flange 3 are made of materials normally used for column pipes, check valves and blind flanges.

Figure 7:
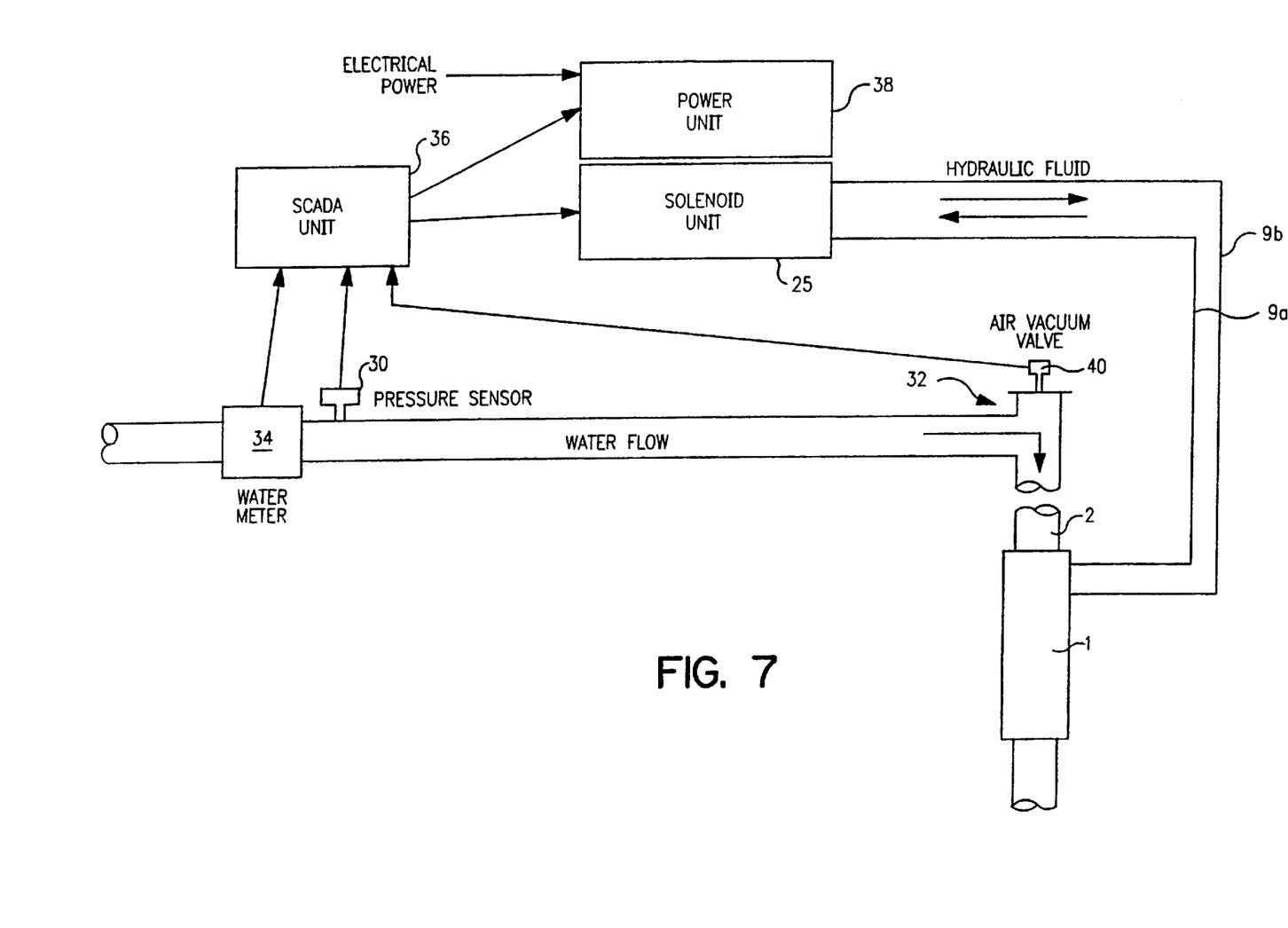
FIG. 7 is a schematic drawing generally illustrating how a supervisory control and data acquisition system (SCADA) controls a well recharging system according to the present invention.

FIG. 7 shows the control system for removing entrained air from inside the drop pipe 2 of an Artificial Storage and Recovery (ASR) or recharge well. As pointed out in the Background of the Invention, entrained air can have detrimental effects and can nearly stop the flow of recharge water.

Supervisory Control and Data Acquisition (SCADA) control of the system may take many forms, depending on the degree of complexity desired. Such a system may include a pressure sensor 30 monitoring pressure at the well head 32 so as to function as a control device to maintain a minimum pressure as well as a flow meter 34. The pressure sensor 30 may be located in a connecting pipe 35 to maintain a positive water pressure at the well head 32 of 5–10 PSI minimum. The water meter 34 is for monitoring and controlling the water flow rate through the system which is controlled by the valve 1. The pressure sensor 30 is monitored by a SCADA control unit 36 with appropriate electronic signals sent to a power unit 38 (which includes a motor and pump) for incremental adjustments to the power unit. The power unit 38 controls the hydraulic solenoid 25 and thus the valve 1 by pumping a hydraulic fluid in hoses 9a and 9b. The hydraulic power unit 38 preferably includes a pilot operated check valve 40. This feature hydraulically locks the hydraulic fluid in position when the directional solenoid valve 22 is in the center position or when the power unit 38 is shut off.

The sequence of starting up the system is to have the valve 1 in the closed position. The drop pipe 2 is filled with water and the connecting piping 35 is pressurized. This allows the air inside the drop pipe 2 to escape through an air vacuum valve 40 at the well head 32. The valve 1 is then positioned manually or by the SCADA control unit 36 to reach and maintain a desired flow rate.

During times when the valve 1 is not being adjusted, the power unit 38 is normally powered down or placed in a stand-by mode by the SCADA control unit 36. When the valve 1 needs to be adjusted, the power unit 38 is turned on and adjustments are made to set or reset the water flow by monitoring the flow meter 34 with the SCADA control unit 36.

The entire disclosure of all applications, patents and publications, cited above and below, and of corresponding U.S. application Ser. No. 08/871,652, filed Jun. 9, 1997, are hereby incorporated in their entirety by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A downhole flow control for use in combination with a recharge well for recharging aquifers, the flow control comprising:

a valve configured as a pipe section having an upper end for coupling through the recharge pipe with a source of pressurized water, an intermediate section, and a lower end for coupling with a flow inhibitor;

a plurality of outlet ports in the intermediate section, through which outlet ports the pressurized water flows into the aquifer;

a sleeve over at least the intermediate section, the sleeve being movable between a first position in which the sleeve covers the outlet ports to block the flow of water out of the outlet ports and a second position in which the sleeve at least partially opens the outlet ports to throttle water flow therefrom into the aquifer; and a double acting hydraulic actuator associated with the sleeve for moving the sleeve between the first and second positions to keep the recharge pipe filled with water, whereby air does not become entrained in the water as the water moves through the recharge pipe so as to enter the aquifer; the double acting hydraulic actuator comprising a first axially extending internal passage in the wall of the intermediate section and a second axially extending internal passage in the wall of the intermediate section, the first passage communicating with a first sub-chamber between the sleeve and the intermediate section and closed by the other side of the radially extending wall, whereby when the first sub-chamber is filled with hydraulic fluid and the second sub-chamber is allowed to empty of fluid the sleeve axially shifts to the first portion and when the second sub-chamber is allowed to empty of fluid the sleeve moves to the second position.

2. The downhole flow control of claim 1, wherein the internal passages are connected to an above-ground hydraulic controller, the hydraulic controller comprising a hydraulic pump and a directional control valve with a flow rate control valve connecting the pump to the internal passages, the directional control valve determining which direction the hydraulic fluid flows in the internal passages and thus whether the sleeve covers or uncovers the outlet ports, and the flow rate control valve controlling the speed at which the sleeve moves from the first position to the second position.

3. The downhole flow control of claim 1, further including a check valve connected between the directional control valve and the hydraulic lines for locking the hydraulic fluid in position when the directional valve is in a center position or when the pump is off.

4. The downhole flow control of claim 3, wherein the outlet ports decrease in area in the direction of the second position.

5. The downhole flow control of claim 1, wherein the valve has a vertical downhole pump coupled to the upper end A', the vertical downhole pump being connected to a recharge pipe that is in turn connected to a motor generator, the flow inhibitor being a check valve.

6. The downhole flow control of claim 1, wherein the valve is connected at the upper end thereof directly to the recharge pipe and connected at the lower end thereof to a vertical downhole pump, the vertical downhole pump having a foot valve at the other end thereof, the flow inhibitor being a check valve.

7. The downhole flow control of claim 1, wherein the valve configured as a pipe section is connected at the upper end thereof to the recharge pipe and wherein the flow inhibitor is a blind flange.

* * * * *